US010089333B2

(12) United States Patent
Banister et al.

(10) Patent No.: US 10,089,333 B2
(45) Date of Patent: Oct. 2, 2018

(54) METHOD AND SYSTEM FOR DYNAMICALLY MODIFYING DATABASE METADATA AND STRUCTURES

(71) Applicants: Richard Banister, Vista, CA (US); William Dubberley, Pulaski, TN (US)

(72) Inventors: Richard Banister, Vista, CA (US); William Dubberley, Pulaski, TN (US)

(*) Notice: Subject to any disclaimer, the term of this patent is extended or adjusted under 35 U.S.C. 154(b) by 325 days.

(21) Appl. No.: 14/806,258

(22) Filed: Jul. 22, 2015

(65) Prior Publication Data
US 2017/0024420 A1    Jan. 26, 2017

(51) Int. Cl.
*G06F 17/30* (2006.01)

(52) U.S. Cl.
CPC .. *G06F 17/30292* (2013.01); *G06F 17/30342* (2013.01); *G06F 17/30595* (2013.01)

(58) Field of Classification Search
CPC ......... G06F 17/30292; G06F 17/30595; G06F 17/30342; G06F 17/30979; G06F 17/30454; G06F 17/30498; G06F 17/30339; G06F 17/30958; G06F 17/30; G06F 17/30463; G06F 17/30528; G06F 17/30545
See application file for complete search history.

(56) References Cited

U.S. PATENT DOCUMENTS

| | | | | |
|---|---|---|---|---|
| 6,772,159 B1* | 8/2004 | Blount | | G06F 17/30575 707/E17.032 |
| 6,996,566 B1* | 2/2006 | George | | G06F 17/30607 707/E17.014 |
| 8,745,029 B2* | 6/2014 | Banister | | G06F 17/30563 707/741 |
| 9,495,062 B1* | 11/2016 | Reiner | | H04L 51/32 707/E17.045 |
| 2001/0052062 A1* | 12/2001 | Lipovski | | G11C 7/065 712/32 |
| 2003/0037037 A1* | 2/2003 | Adams | | G06F 17/30321 707/E17.001 |
| 2003/0065688 A1* | 4/2003 | Dageville | | G06F 17/30306 707/E17.014 |
| 2004/0215626 A1* | 10/2004 | Colossi | | G06F 17/30312 707/E17.014 |
| 2006/0064313 A1* | 3/2006 | Steinbarth | | G06Q 10/10 705/322 |
| 2006/0155915 A1* | 7/2006 | Pereira | | H04L 45/00 711/100 |
| 2009/0031006 A1* | 1/2009 | Johnson | | H04W 76/11 709/218 |

(Continued)

*Primary Examiner* — Anh Ly
(74) *Attorney, Agent, or Firm* — Patrick Reilly

(57) ABSTRACT

A system and method enable the selection of database records for editing and writing. A database record is queried for the size of the data fields contained therein. The size of the data field is compared to the field width limitation of a storage database. When it is determined that the data field displays a size greater than the size of the field width limitation of the storage database, a computing device extends the size of the limitation to accommodate the new database record data field. When the size of the limitation is expanded, the new database record is written to the storage database. The system and method may optionally include the input of a user at the final steps, wherein the user may optionally approve or disapprove the extension of the size of the field width limitation.

16 Claims, 11 Drawing Sheets

(56) References Cited

U.S. PATENT DOCUMENTS

| | | | |
|---|---|---|---|
| 2009/0063504 A1* | 3/2009 | Banister | G06F 17/30563 707/E17.001 |
| 2011/0082864 A1* | 4/2011 | Banister | G06F 17/30563 707/741 |
| 2011/0156864 A1* | 6/2011 | Green | G06K 19/025 340/5.2 |
| 2013/0339398 A1* | 12/2013 | Griggs | G06F 17/30345 707/E17.044 |
| 2016/0098348 A1* | 4/2016 | Burton | G06F 12/0215 711/137 |
| 2017/0024420 A1* | 1/2017 | Banister | G06F 17/30292 707/741 |

* cited by examiner

METHOD AND SYSTEM FOR DYNAMICALLY MODIFYING DATABASE METADATA AND STRUCTURES

FIELD OF THE INVENTION

The present invention relates to the relatedness of two or more databases that are within an electronic communications network. The present invention more particularly relates to the alteration of a destination database metadata to match those of a source database.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art enables transfer of data between source and destination databases, but fails to efficiently solve the problem of mismatches between software records stored on source and destination databases, and between the metadata associated with the software records. The previously existing methods of data transfer do not efficiently automate the process by which software metadata is altered when discrepancies are discovered between the source and destination databases; the process by which metadata is edited is currently largely manual and thus time-consuming. There is therefore a long-felt need to provide a method and system that provide increased efficiencies in software metadata editing and coordination.

SUMMARY AND OBJECTS OF THE INVENTION

Towards these objects and other objects that will be made obvious in light of the present disclosure, a system and method are provided that enable receiving a software record having data associated with specific data fields, wherein the actual magnitude of at least some of the received datum exceed in size a previously established memory size limitation of a receiving database as specified by a metadata of the relevant receiving database. Further provided in the method of the present invention (hereinafter the "invented method") is a process by which a new data width size limitation of a target computing device, wherein the size of the data field of the received software record may be the template by which the new size limitation is generated.

According to an additional aspect of the invented method, the first computing device may additionally render the size error to a user, and may subsequently receive input from the user regarding alteration of the data field limitation.

According to alternate embodiments of the invented method, an invented computational device is provided. The invented computational device (hereinafter, "invented device") includes: a memory coupled with a processor, wherein the memory and processor are enabled to run database management software; the capacity for database generation; the capacity for receiving and interpreting software record metadata; the capacity to determine whether and how to alter the metadata of a software record; the capacity to write software records to on or more databases; the capacity to render information to a user; and the capacity to receive instructions from a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which.

DETAILED DESCRIPTION

Figure 1:
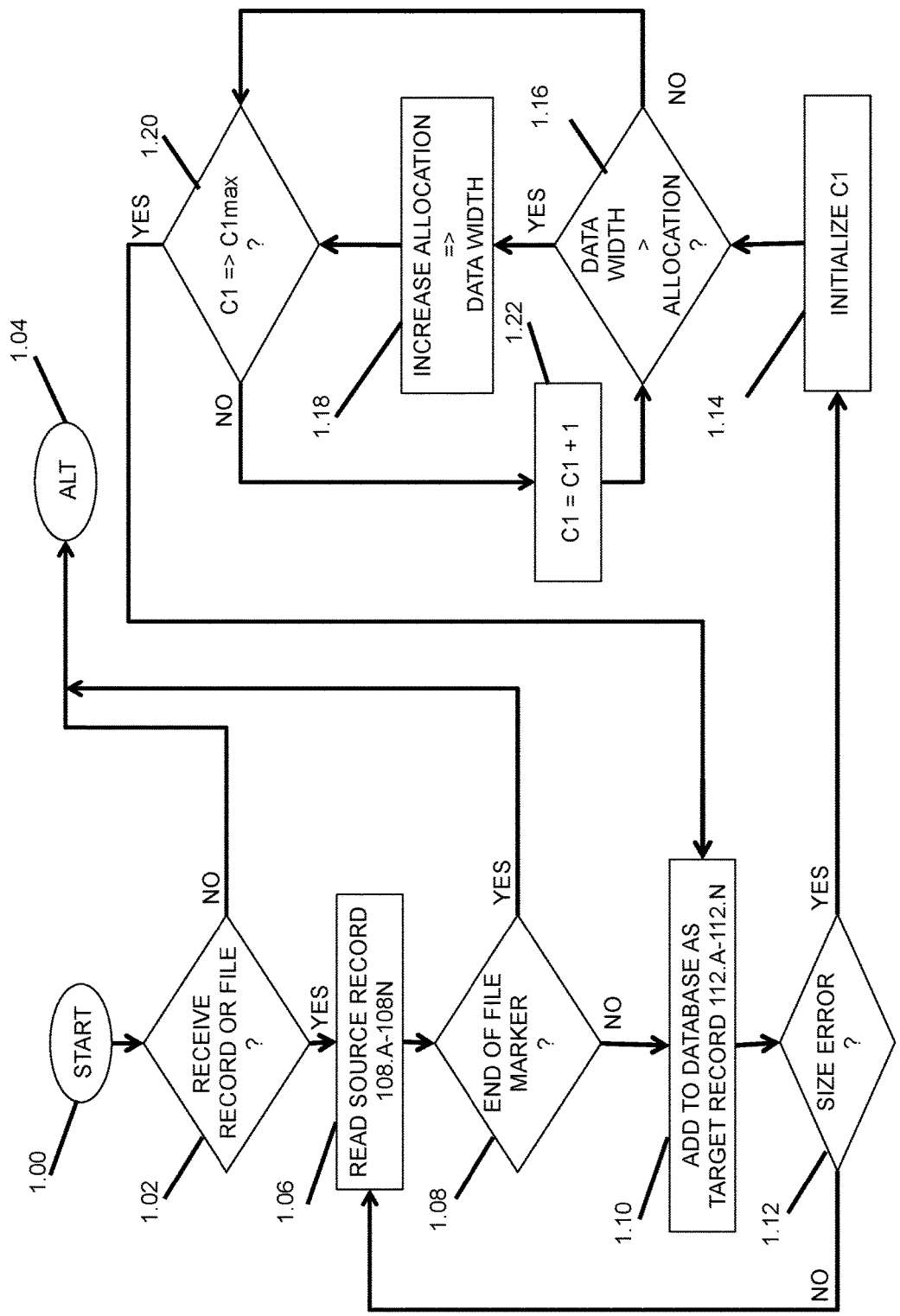
FIG. 1 is a flowchart of an overview of the invented method, whereby the metadata of designated records are modified within a target database.
Figure 6:
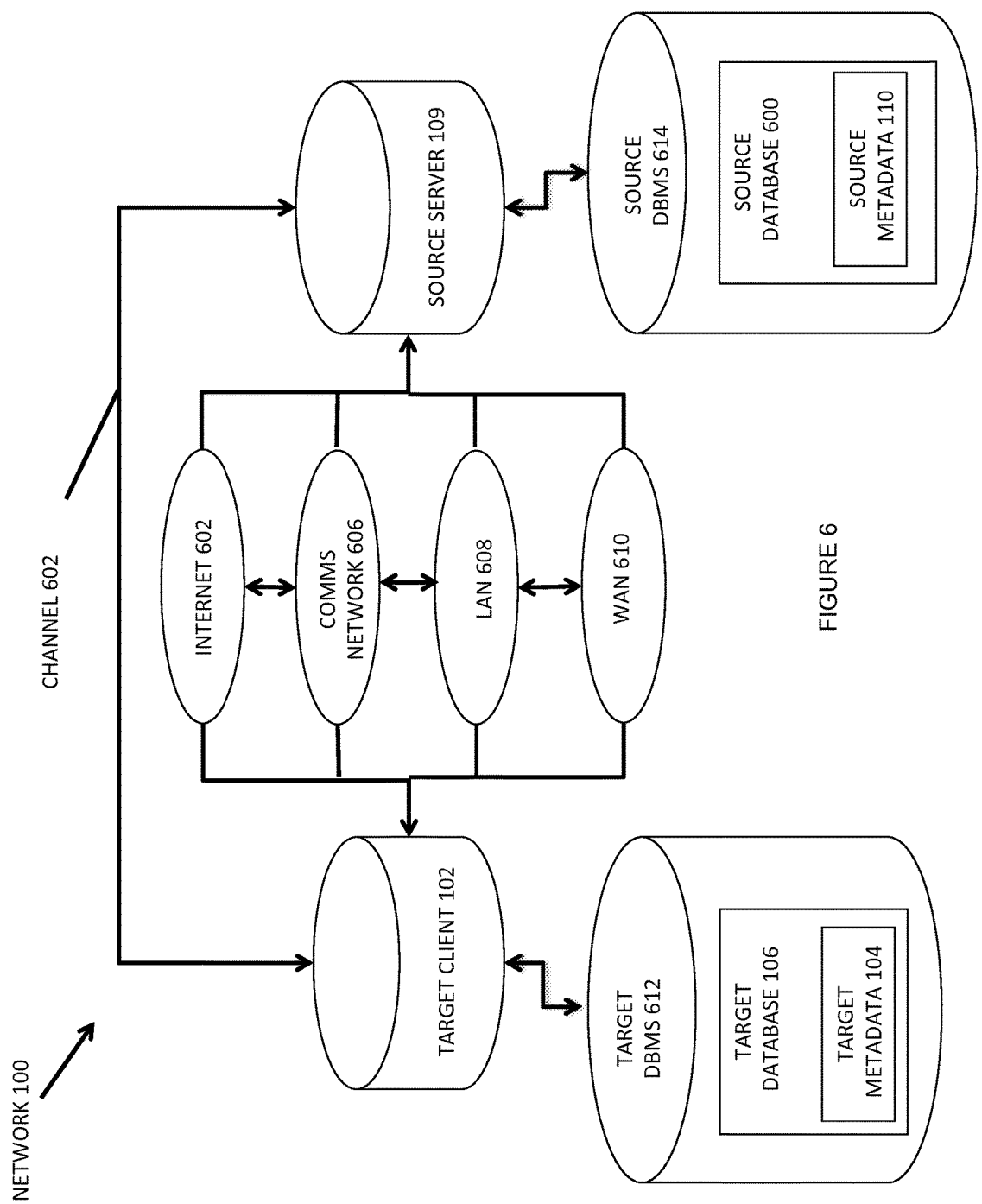
FIG. 6 is a diagram of an electronic communications network, comprising a target client, a target database, a source database, and a source server, the target client and the source server bidirectionally communicatively coupled by means of one or more of a channel, the Internet, a communications network, a LAN and/or a WAN.

Referring now generally to the Figures, and particularly to FIG. 1 and FIG. 6, FIG. 1 is a flowchart of an aspect of the invented method that may be performed by means of a bi-directional electronic communications network 100 wherein a target computer system 102 (hereinafter, "target client" 102) receives and modifies target metadata column width values TWV.01-TWV.N1 of a target database metadata 104 (hereinafter, "target metadata" 104) of a target database 106. In step 1.02 the target client 102 determines whether one or more source records 108.A-108.N or a file comprising source records 108.A-108.N, and optionally with a corresponding source metadata 110 has been received from a source server 109. When the target client 102 determines in step 1.02 that no source record 108.A-108.N or file of source records 108.A-108.N has been received, the target client 102 executes alternate operations in step 1.04.

Alternatively, when the determination in step 1.02 is that one or more source records 108.A-108.N or a file of source records 108.A-108.N and optionally with a corresponding source metadata 110 has been received, the target client 102 reads a first selected, or a next sequentially ordered, source record 108.A-108.N in step 1.06. In step 1.08 the target client 102 determines whether an end of file marker EFM has been read in step 1.06 to indicate that a final source record 108.A-108.N of a file has been received and read in step 1.06. When the determination in step 1.08 is that an end of file marker EFM as received in step 1.02 has been read in step 1.06, the target client 102 executes alternate operations in step 1.04.

Alternatively, when the determination in step 1.08 is that no end of file marker EFM has not been read in step 1.06, the target client 102 advances to step 1.10, wherein the target client 102 accepts a first or next sequentially ordered source record 108.A-108.N and writes the contents of the selected source record 108.A-108.N into a target record 112.A-112.N of the selected target database 106 contained within a target memory 102A of the target client 102. In step 1.12, the target client 102 determines whether a size exception is found between the target metadata 104 of the target database 106 and the content of the source record 108.A-108.N as read into the target record 112.A-112.N in step 1.10. When no size exception is determined in step 1.12, the target client 102 returns to step 1.06 and to read another received and sequentially source record 108.A108.N.

It is understood that the Nth value of the target records 112.A-112.N and source records 108.A-108.N element numbers is unrelated to the N1 value of the target metadata column width values TWV.01-TWV.N1.

Alternatively, when a size exception determination is found by the target client 102 in step 1.12, the target client 102 proceeds to step 1.14, wherein the target client 102 sets a first counter C1 to an initialization value, such as a null or a zero value and sets a column count maximum value C1max, wherein the column count maximum value C1max indicates the number of columns values TWV.01-TWV.N1 indicated in the target metadata 104. In step 1.16 the target client 102 determines whether an actual data length size DLS.C1, or data width, of a first selected data field or next sequentially ordered data field DF.C1 of the target record 112.A-112.N is greater than a corresponding allocated target column width value TWV.C1, or allocation, of the target metadata 104 of the target database 106 allows. It is understood in the flowchart process steps of the Figures that (a.) the textual indicator of DATA WIDTH indicates an observed data size DLS.C1 of a currently examined data field DF.C1; and (b.) the textual indicator of allocation indicates a numerical value of a target metadata column width value TWV.c1

When the determination in step 1.16 is that the actual data length size DLS.C1 of the instant selected data field DF.C1 of the target record 112.A-112.N excepted in step 1.12 is not greater than a target metadata column width value TWV.C1 corresponding to the data length size DLS.C1 of the currently selected data of the instant data field DF.01-DF.N of the target metadata 104 allows, the target client 102 proceeds onto step 1.20 and determines whether there are additional unexamined columns data field columns of the currently examined target record 112.A-112.N.

It is understood that the nominal value is used herein to denote a final element of a set of values within each series of values presented herein. It is further understood that the column count maximum value C1max preferably equals or is equivalent to a N1 target database column count value N1 of the target metadata column width values TWV.01-TWV.N1. It is also understood that the target database column count value N1 value of the plurality of target records 112.A-112.N is unrelated to the nominal length parameter value indicator N2 of the actual data length sizes DLS.01-DLS.N2.

It is understood that the N2th value actual data length sizes DLS.01-DLS.N2 is unrelated to the Nth value of the target records 112.A-112.N and source records 108.A-108.N element numbers.

In the alternative, when the determination in step 1.16 is that than the currently examined data field length size DLS.C1 is greater than a corresponding target metadata column width value TWV.C1 of the target metadata 104, the target client 102 increases the size of the corresponding target metadata column width value TWV.C1 in step 1.18. In step 1.18, the size of the metadata column value TWV.C1 is altered by increasing the size of the metadata column value TWV.C1 to be equal to or optionally greater than the data field length size DLS.C1 of the currently examined data field DF.C1.

Alternately or additionally, the size of the currently selected metadata column value TWV.C1 may optionally be altered by increasing the size of the metadata column by an arbitrary, previously determined range R.1-R.N to the next highest prerecorded range R.1-R.N.

In step 1.20 the target client 102 determines whether the first counter value C1 is greater than or equal to a maximum first counter value C1max, wherein the maximum first counter value C1max corresponds to a final N1th value of the plurality of target width values TWV.01-TWV.N1 of the target metadata 104.

When the determination in step 1.20 is negative, the first counter C1 is incremented to equal the previous value of the first counter C1 plus one in step 1.22. Upon execution of step 1.22, the target client 102 proceeds to step 1.16. In the alternative, when the determination in step 1.20 is that the counter C1 is equal or greater than the column count maximum value Cmax, the target client 102 proceeds to step 1.10.

Figure 2:
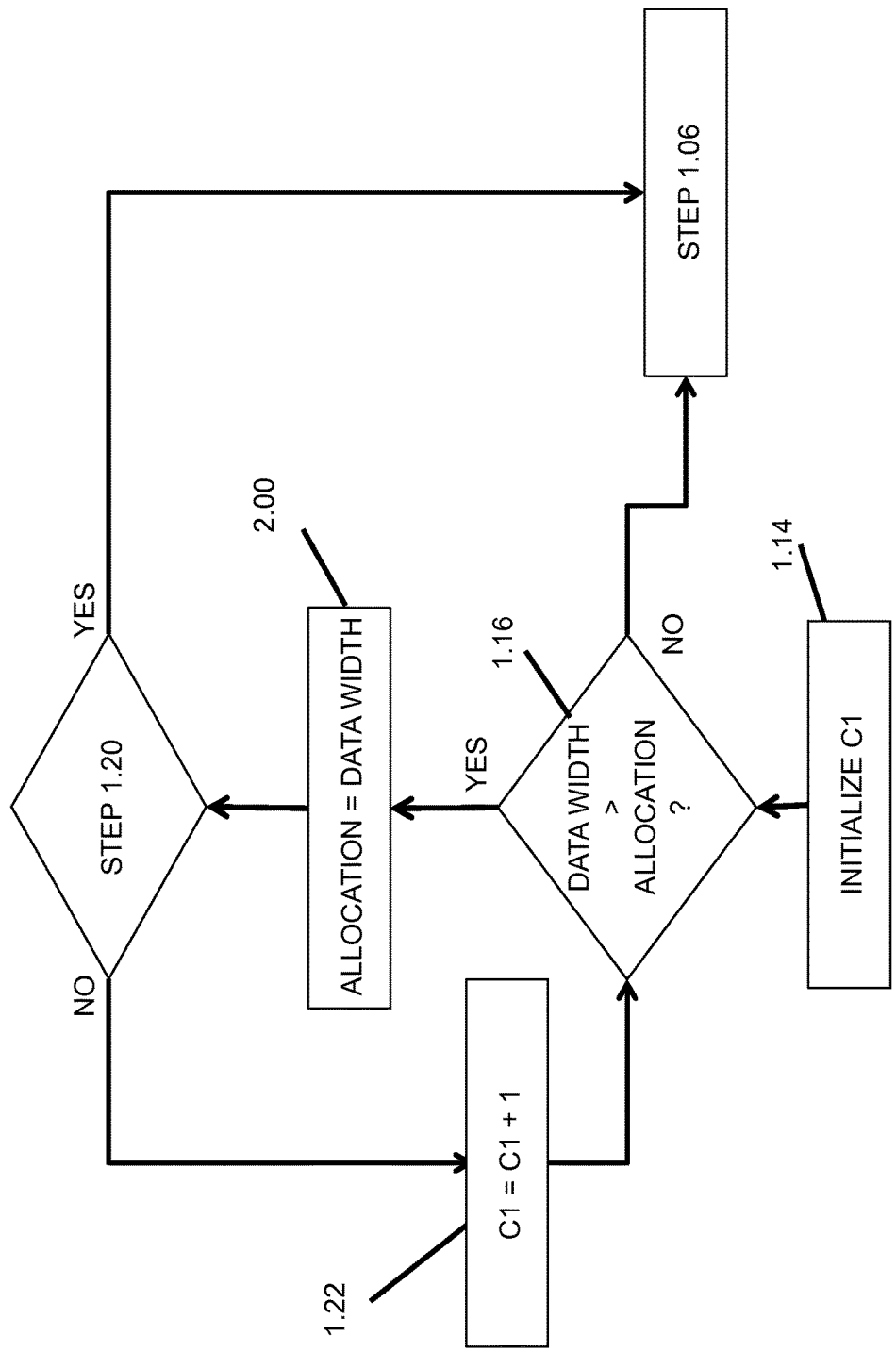
FIG. 2 is a flowchart of a preferred embodiment of process step 1.18 of the process of FIG. 1, wherein the a selected target metadata width value is set to be equal to an observed value of a data assigned to a data field of a target record.

Referring now generally to the Figures, and particularly to FIG. 1 and FIG. 2, FIG. 2 presents is a preferred embodiment of step 1.18 whereby in step 200 the target metadata column width value TWV.C1, or ALLOCATION, selected in the most recent instantiation of step 1.16 is set equal to the actual data the data field length size DLS.C1, or DATA WIDTH, of the examined data field DF.C1 as selected in the most recent instantiation of step 1.16.

Figure 3:
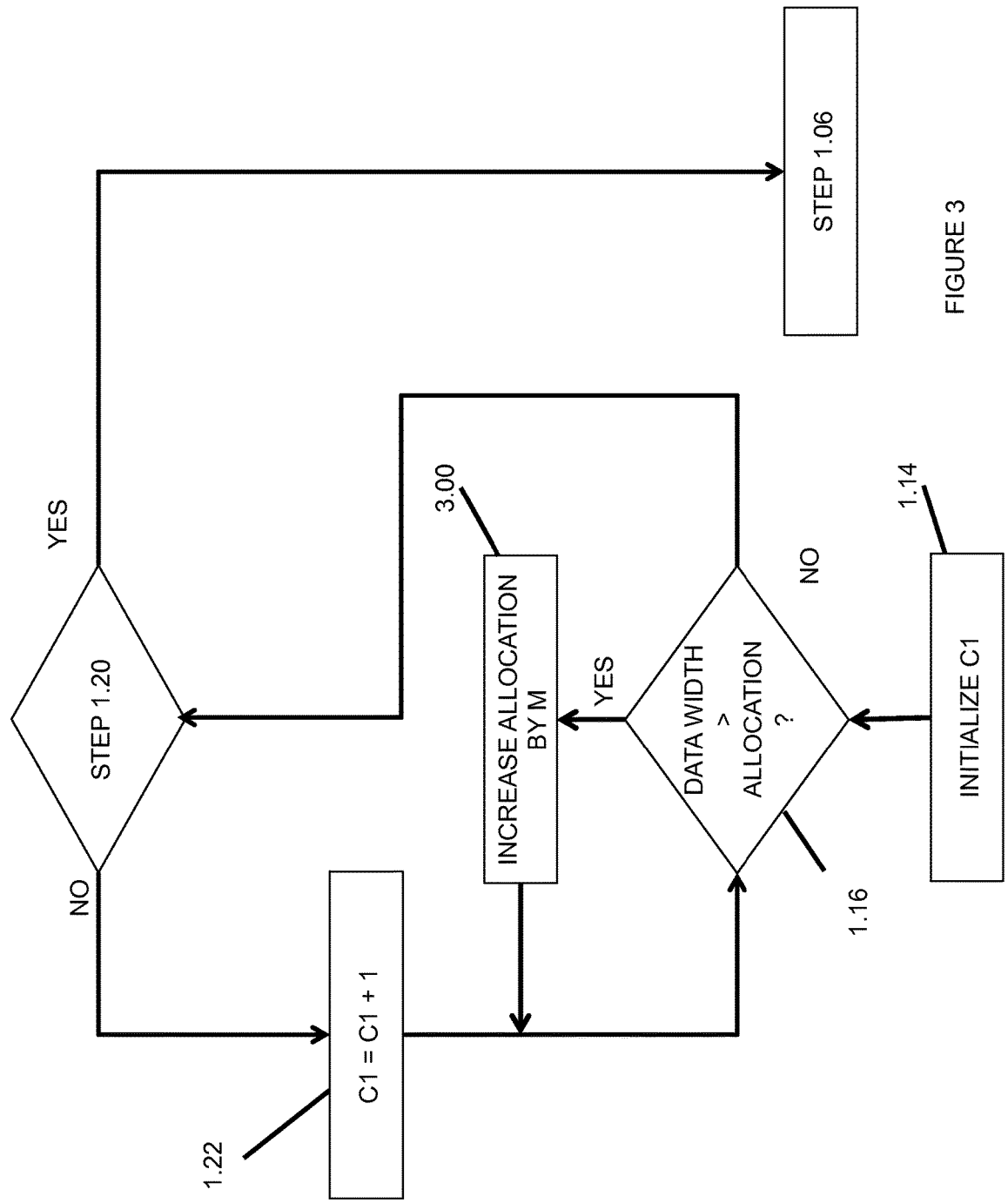
FIG. 3 is a flowchart of an alternate preferred embodiment of process step 1.18 of the process of FIG. 1, wherein the a selected target metadata width value is incrementally increased to be made equal to or greater than an observed value of a data assigned to a data field of a target record.

Referring now generally to the Figures, and particularly to FIG. 1 and FIG. 3, FIG. 3 presents is an alternate preferred embodiment of step 1.18 wherein the selected target metadata column width value TWV.C1 selected in the most recent instantiation of step 1.16 is incremented by a whole number value M in step 3.00. Step 3.00 is reinstantiated until the target metadata column width value TWV.C1 selected in the most recent instantiation of step 1.16 is increased to be equal to or greater than the value of to the actual data the data field length size DLS.C1 as selected in the most recent instantiation of step 1.16.

Figure 4:
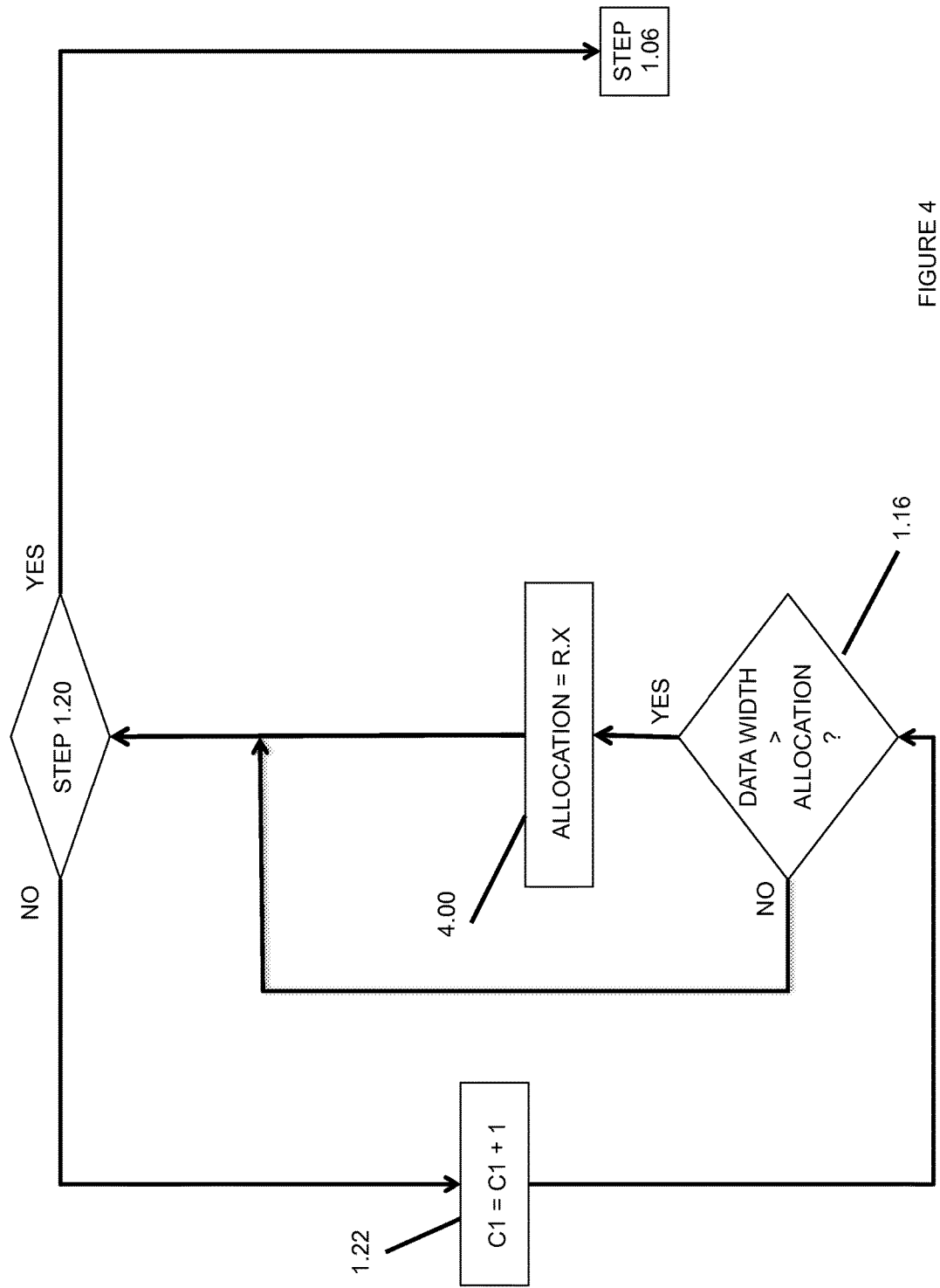
FIG. 4 is a flowchart of an additional alternate preferred embodiment of process step 1.18 of the process of FIG. 1, wherein the a selected target metadata width value is increased to a width value selected from a set of preset values as accessible to the target client.

Referring now generally to the Figures, and particularly to FIG. 1 and FIG. 4, FIG. 4 presents is an additional alternate preferred embodiment of step 1.18 wherein the current allocated data width value, i.e. the target metadata column width value TWV.C1, selected in the most recent instantiation of step 1.16, is increased to a range R.X selected from a preset group of range values R.01-R.MAX. It is understood that the range values R.01-R.MAX are ordered to increase in value as they are sequentially examined and selected range R.X is chosen as revised value in step 4.00 of the currently selected target metadata column width value TWV.C1. In the execution of step 4.00 the currently selected target metadata column width value TWV.C1 is made equal to a selected range value R.X, wherein the selected range R.X is the smallest range R.01-R.MAX that is larger than the current data length value of the currently examined data length DLS.C1.

Figure 5:
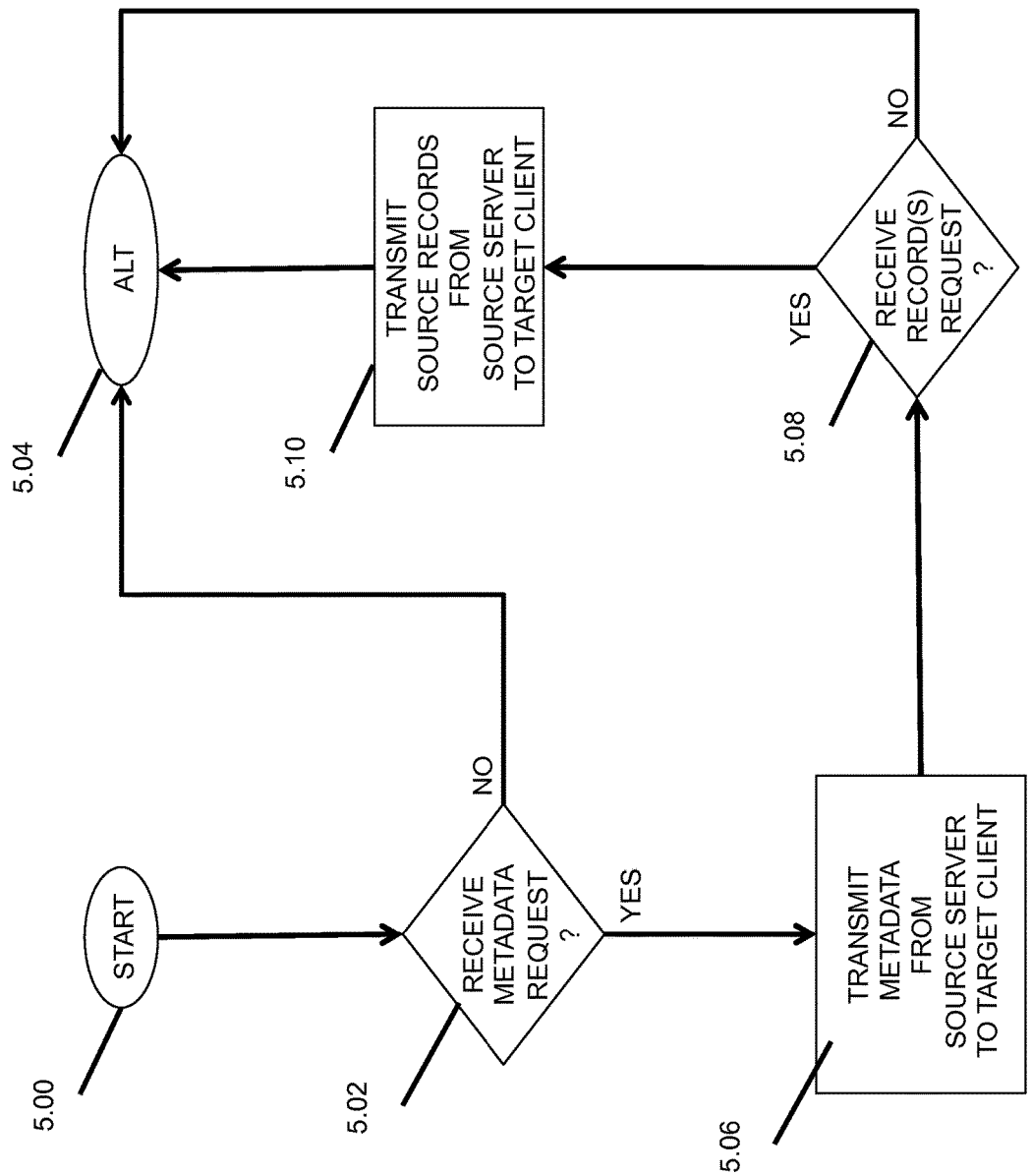
FIG. 5 is a flowchart of an additional aspect of the invented method whereby a source server facilitates the invented method.

Referring now generally to the Figures, and particularly to FIG. 5, FIG. 5 is a flowchart of an aspect of the invented method whereby the source server 109 receives a request for source metadata 110 and/or source records 108.A-108.N, and transmits source metadata 110 and/or source records 108.A-108.N to the target client 102. In step 5.02 the source server 109 determines whether a request has been received for source metadata 110. When the determination in step 5.02 is negative, the source server 109 executes alternate operations. Alternatively, when the determination in step 5.02 is positive, the source server 109 transmits the source metadata 110 from the source server 109 to the target client 102. In step 5.08 the source server 109 determines whether a request has been received from the target client 102 for the source records 108.A-108.N. When the determination in step 5.08 is negative, the source server 109 executes alternate operations. In the alternative, when the determination in step 5.08 is positive, the source server 109 transmits the source records 108.A-108.N to the target client 102 in step 5.10. The source server subsequently executes alternate operations in step 5.12.

Referring now generally to the Figures, and particularly to FIG. 6, FIG. 6 is a diagram of an electronic communications network, comprising the target client 102, the source server 109, the target database 106 and a source database 600, wherein the target client 102 and the source server 109 are bidirectionally coupled by means of a bi-directional communications channel 602, wherein the bi-directional communications channel 602 may be or comprise the Internet 604, a communications network 606, a local access network ("LAN") 608 and/or a wide area network ("WAN") 610. The target database 106 and the source database 600, are each preferably comprised within a separate database management system ("DBMS") software, respectively a target DBMS 612 and a source DBMS 614. The target DBMS 612 is accessible to, and may be wholly or partially comprised within, the target client 102. The source DBMS 614 is accessible to, and may be wholly or partially comprised within, the source server 109.

The target DBMS 612 and/or the source DBMS 614 may be or comprise an object oriented database management system ("OODBMS") and/or a relational database management system ("RDBMS"). More particularly, the target DBMS 612 and/or the source DBMS 614 may be or comprise one or more prior art database management systems including, but not limited to, an ORACLE DATABASE™ database management system marketed by Oracle Corporation, of Redwood City, Calif.; an MQSERIES™ database management system marketed by SyBase, Inc. of Dublin, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; and the POSTGRESQL™ open source object-relational database management system.

It is understood that the target client 102, the source server 109, the target DBMS 612, and/or the source DBMS 614 may comprise a software program hosted and/or enabled by a computational system, or may be or comprise a bundled computer software and hardware product such as, (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; or (e.) other suitable computational system or electronic communications device known in the art capable of providing or enabling a web service known in the art.

Figure 7:
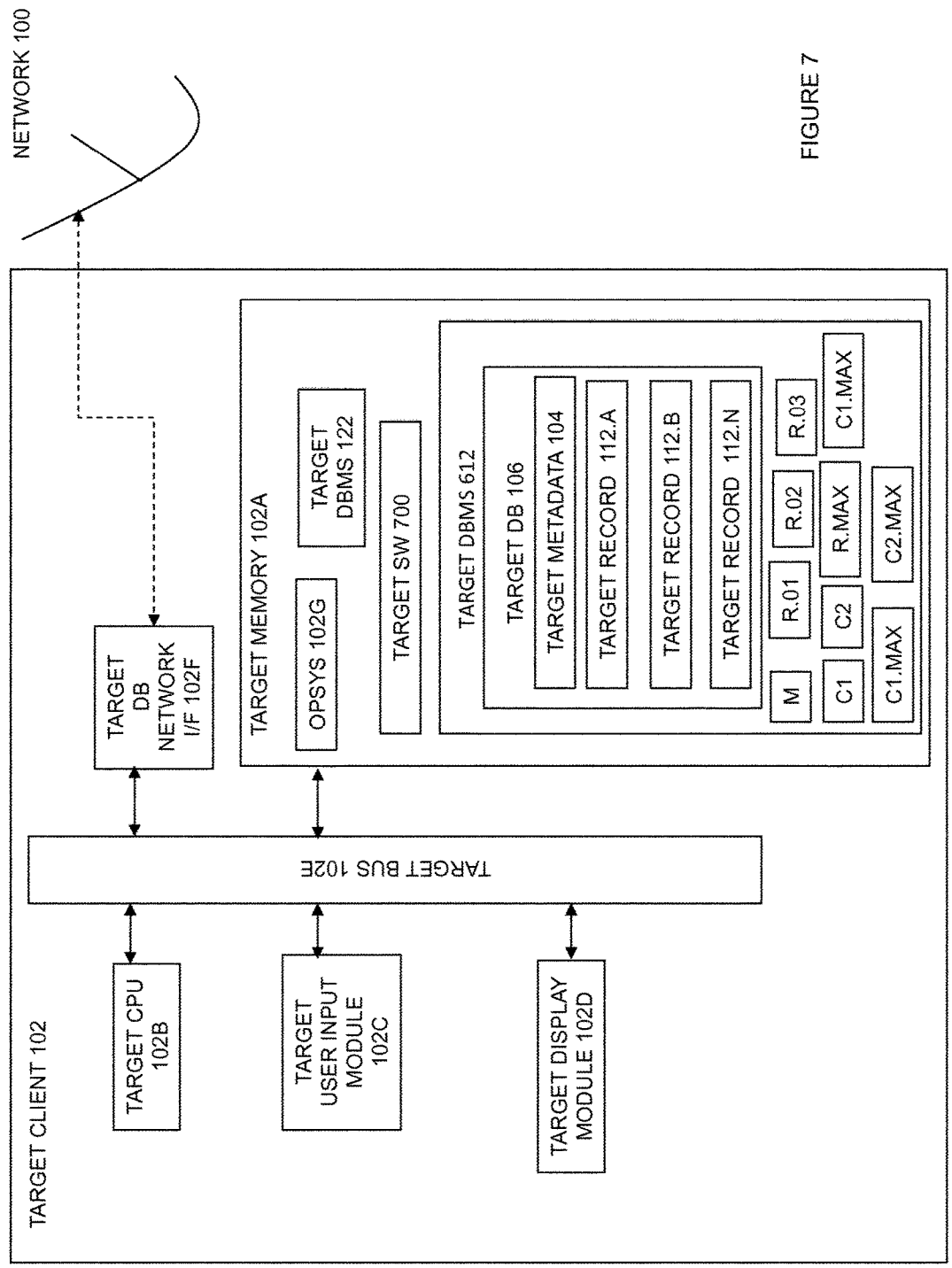
FIG. 7 is a block diagram of the target client of FIG. 1.

Referring now generally the Figures, and particularly to FIG. 7, FIG. 7 is a block diagram of the target client 102 of the electronic bi-directional communication network 100 of FIG. 6, wherein the target client 102 comprises the target memory 102A, a target central processing unit ("CPU") 102B; a target user input module 102C; a target display module 102D; and a target software bus 102E that bidirectionally communicatively couples the target CPU 102B with the target user input module 102C, the target display module 102D. The target software bus 102E is further bidirectionally coupled with a target database network interface 102F, enabling communication with alternate computing devices by means of the electronic communications network 100 and the target CPU 102B. The target software bus 102E facilitates communications between the above-mentioned components of the target client 102. The target memory 102A of the target client 102 includes a client software operating system OPSYS 102G. The software OPSYS 102G of the target client 102 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS VISTA™ or WINDOWS 7™ operating system as marketed by Microsoft Corporation of Redmond, Wash.; or the MAC OS X operating system or iPhone G4 OS™ as marketed by Apple, Inc. of Cupertino, Calif.

The target memory 102A further includes a target software 700, which target software 700 empowers the target client 102 to perform the invented method as presented in the steps of FIG. 1, and FIG. 2. Further contained within the target client 102 is target metadata 104 and the target database 106, which target database 106 contains a plurality of target records 112.A-112.N which may be transmitted from the target client 102 to the source server 109. It is understood that the target metadata 104 includes the target column width values TWV.01-TWV.N1 for certain or all columns of target records 112.A-112.N. It is understood that the target metadata 104 may be distributed among the target records 112.A-112.N and includes individual target column width size values TWV.01-TWV.N1 for some or all of the columns of each target record 112.A-112.N.

Figure 8:
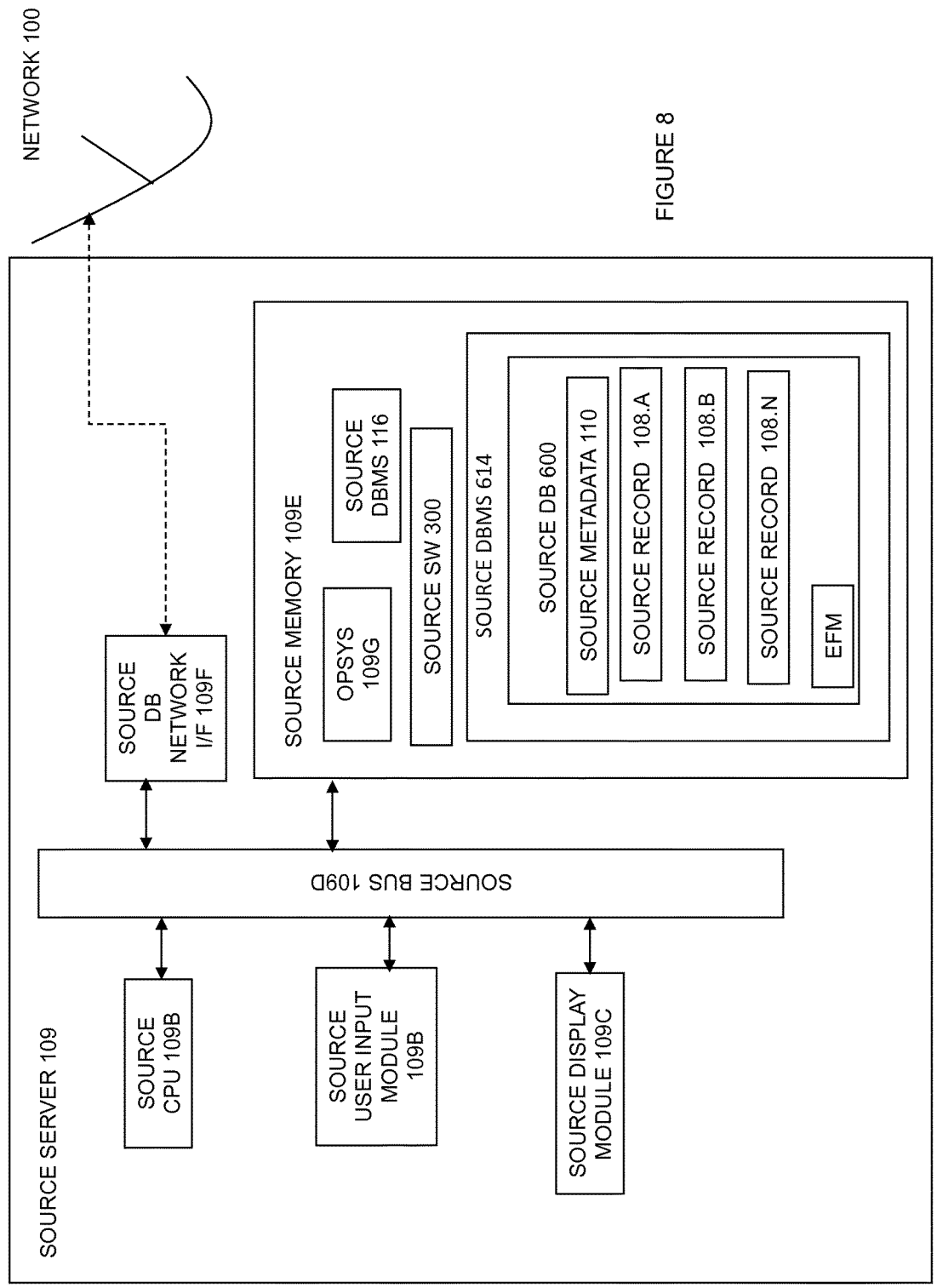
FIG. 8 is a block diagram of the source server of FIG. 1.

Referring now generally the Figures, and particularly to FIG. 8, FIG. 8 is a block diagram of the source server 109 of the network 100 of FIG. 6, wherein the source server 109 comprises a source central processing unit ("CPU") 109A; a source user input module 109B; a source display module 109C; and a source software bus 109D that bidirectionally communicatively couples a the source CPU 109A, the source user input module 109B, the source display module 109C and a source memory 109E. The source software bus 109D further bidirectionally couples the a source database network interface 109F with the source CPU 109A and enabling communication with alternate computing devices by means of the electronic communications network 100 and the source memory 109E. The source software bus 109D facilitates communications between the above-mentioned components of the source server 109. The source memory 109E of the source server 109 includes a server software operating system OPSYS 104G. The software OPSYS 104G of the source server 109 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS VISTA™ or WINDOWS 7™ operating system as marketed by Microsoft Corporation of Redmond, Wash.; or the MAC OS X operating system or iPhone G4 OS™ as marketed by Apple, Inc. of Cupertino, Calif.

The source memory 109E further includes a source software 900 that empowers and directs the source server 109 to perform the invented method as presented in the steps of FIG. 1, and FIG. 2. Further contained within the source memory 109E is source metadata 110 and the source database 600, which source database 600 contains the plurality of source records 108.A-108.N which may be transmitted from the source server 109 to the target client 102.

Figure 9:
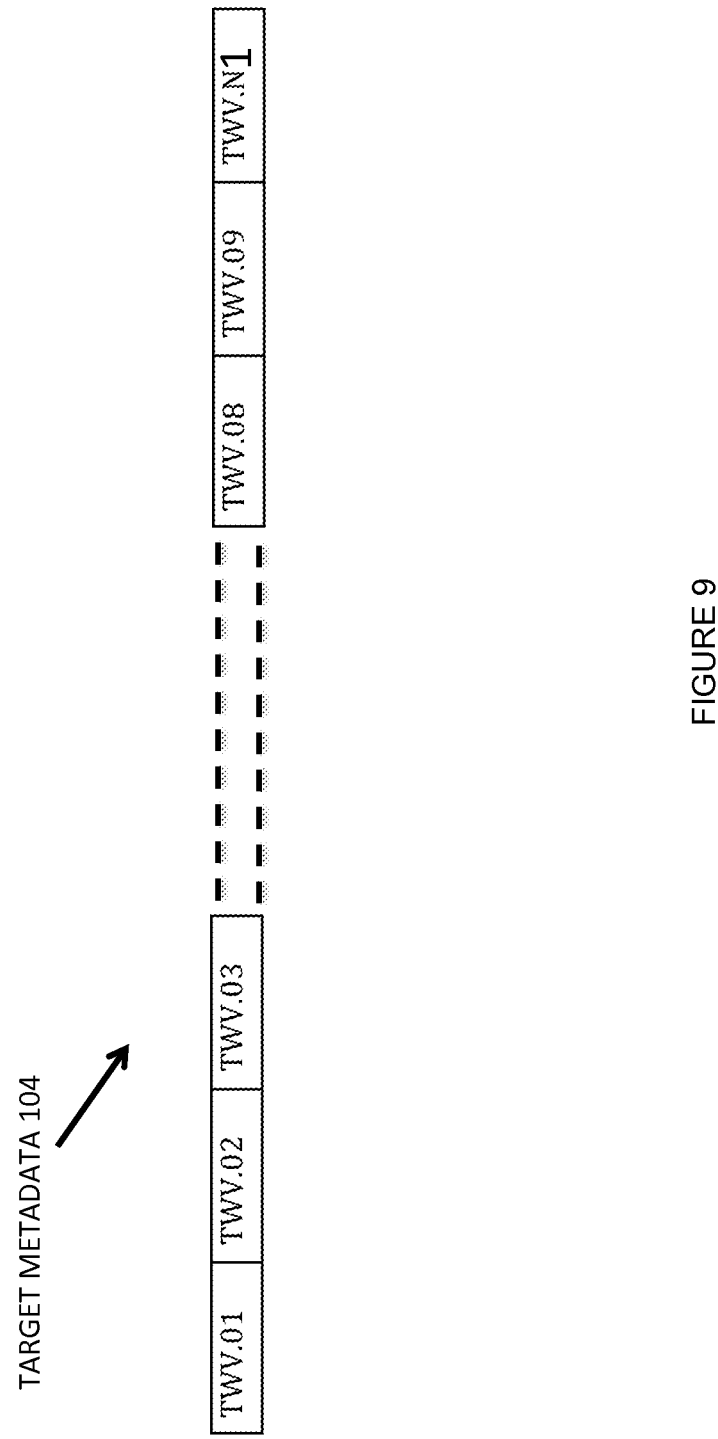
FIG. 9 is a block diagram of an exemplary target metadata of a target database of FIG. 1.

FIG. 9 is a block diagram of the exemplary target metadata 104 of a target database 106, wherein the plurality of target metadata column width values TWV.01-TWV.N1 are shown to be comprised within the target metadata 104.

Figure 10:
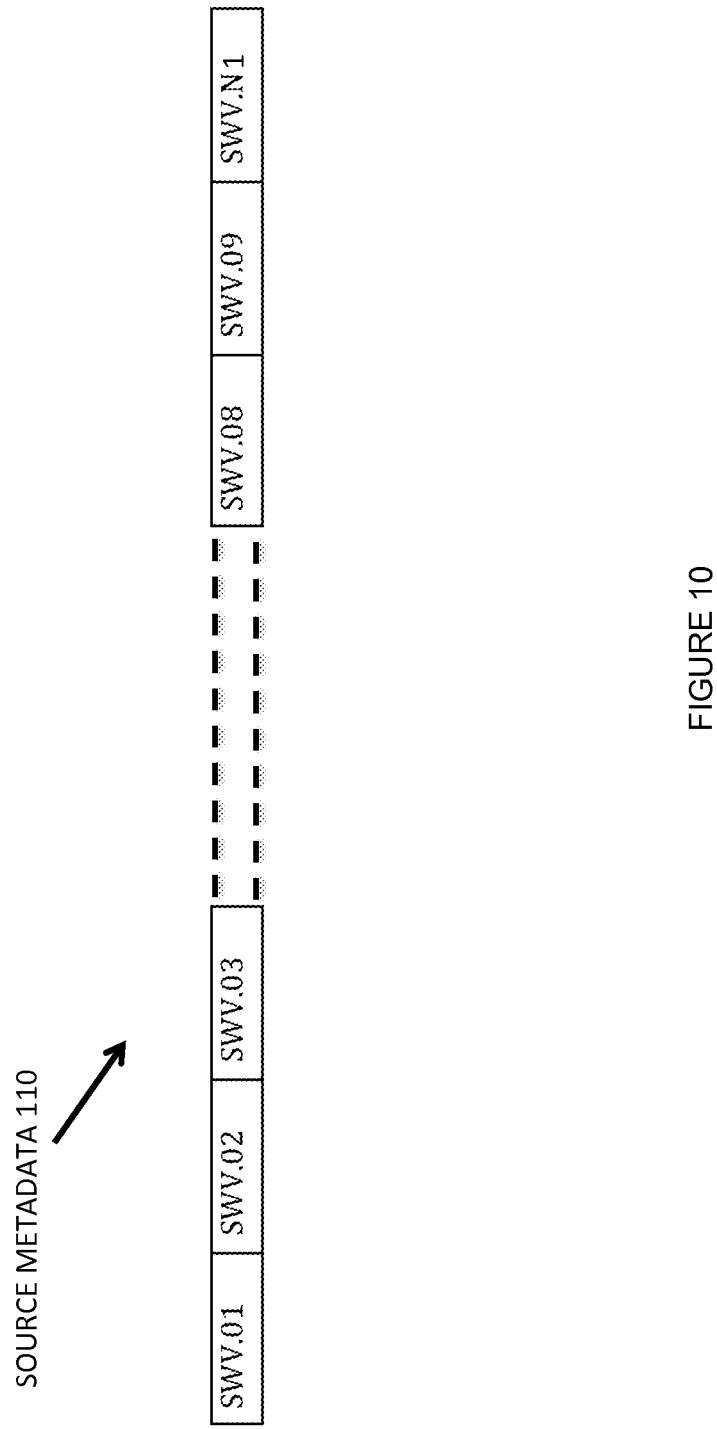
FIG. 10 is a block diagram of an exemplary source metadata of a source database of FIG. 1.

FIG. 10 is a block diagram of the exemplary source metadata 110 of the exemplary source database 600, wherein a plurality of source metadata column width values SWV.01-SWV.N1 are shown to be comprised within the source metadata 110.N1

Figure 11:
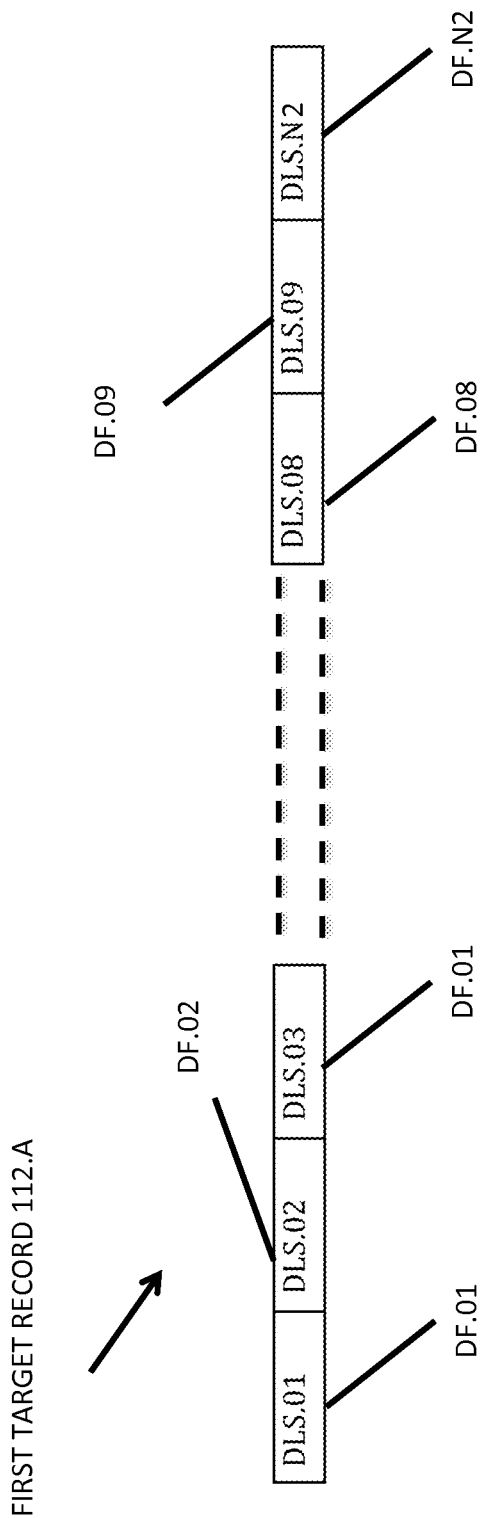
FIG. 11 is a block diagram of an exemplary target record of a target database of FIG. 1.

FIG. 11 is a block diagram of the exemplary first target record 112.A and shoeing a plurality of data fields DF.01-DF.N, wherein each data field DF.01 has a specific actual and observed data length sizes DLS.01-DLS.N2.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. A computer implemented method for modifying a database structure in a computer, the computer having a processor coupled with a memory and adapted to enable a database management software, the method comprising:
   a. Structuring a database table having at least one data field having a data field width allocation;
   b. Receiving a data record having at least one data field that exceeds the a corresponding data field width allocation;
   c. Attempting to insert or update the data record into the database;
   d. Detecting a DBMS error message indicating that at least one data field exceeds a data field allocation width;
   e. Comparing each data field content of the data record with a corresponding data field width allocation as described by metadata of the database;
   f. Determining a new metadata data field width allocation, the new metadata data field width allocation greater or equal to a width sufficient to store the corresponding data field content of the data record;
   g. Adjusting the metadata data field width allocation to the new metadata data field width allocation; and
   h. Inserting or updating the data record into the database.

2. The method of claim 1, wherein the database is a relational database.

3. The method of claim 2, wherein the newly input data base record is a relational database record.

4. The method of claim 2, wherein the data field is expressed as a column of the relational database.

5. The method of claim 1, wherein the database is an object oriented data base.

6. A computer implemented method for modifying a database structure in a computer, the computer having a processor coupled with a memory and adapted to enable a database management software, the method comprising:
   a. Structuring a data base having at least one data field having a metadata width allocation;
   b. Receiving a data assigned to the at least one data field that exceeds the metadata width allocation;
   c. Determining a new metadata width allocation, the new metadata width allocation equal to a memory size sufficient to store the data;
   d. Informing a user that the data exceeds the metadata width allocation of the data field; and
   e. Increasing the metadata width allocation to the new width allocation.

7. The method of claim 6 wherein the database is a relational database.

8. The method of claim 7, wherein the newly input data base record is a relational database record.

9. The method of claim 7, wherein the data field is expressed as a column of the relational database.

10. The method of claim 6, wherein the database is an object oriented data base.

11. A computer comprising:
    a. a memory;
    b. a processor coupled with the memory, the processor and memory adapted to enable a database management software, wherein the memory is configured to store instructions that, when executed by the processor, cause the computer to:
       i. Structure a database having at least one data field having a metadata width allocation;
       ii. Receive a data assigned to the at least one data field that exceeds the metadata width allocation;
       iii. Determine a new metadata width allocation, the new metadata width allocation equal to a memory size sufficient to store the data; and
       iv. Increase the metadata width allocation to the new width allocation.

12. The computer of claim 11 further comprising:
    g. an output module and an output module communicatively coupled with the processor, and wherein the instructions further direct the computer to:
       v. inform a user that the new data exceeds the metadata width value allocation of the data field; and
       vi. receive and execute an instruction to increase the metadata data field width value allocation to the new width data field value allocation.

13. A computer implemented method for modifying a database structure in a computer, the computer having a processor coupled with a memory and adapted to enable a database management software, the method comprising:
    a. Structuring a database table having at least one data field having a data field width allocation as maintained in a metadata;
    b. Receiving a data record having at least one data field having a content that exceeds a corresponding data field width allocation of the metadata;
    c. Determining a new metadata data field width allocation, the new metadata data field width allocation greater or equal to a width sufficient to fully store the content of the at least one data field of the data record;
    d. Adjusting the corresponding metadata data field width allocation to the new metadata data field width allocation; and
    e. Inserting or updating the data record into the database.

14. The method of claim 13, further comprising:
    a. Attempting to insert or update the data record into the database prior to determining that the corresponding data field width allocation of the metadata is insufficient to fully store the content of the at least one data field of the data record;
    b. Detecting a DBMS error message indicating that the at least one data field exceeds the corresponding data field allocation width;
    c. Proceeding on to determining a new metadata data field width allocation, the new metadata data field width allocation greater or equal to a width sufficient to fully store the content of the at least one data field of the data record;
    d. Adjusting the corresponding metadata data field width allocation to the new metadata data field width allocation; and
    e. Inserting or updating the data record into the database.

15. The method of claim 13, further comprising:
    a. Attempting to insert or update the data record into the database prior to determining that an additional corresponding data field width allocation of the metadata is insufficient to fully store the content of an additional data field of the data record;
    b. Detecting a DBMS error message indicating that the additional data field exceeds the additional corresponding data field allocation width;
    c. Proceeding on to determining an alternate metadata data field width allocation, the alternate metadata data field width allocation greater or equal to a width sufficient to fully store the content of the additional data field of the data record;
    d. Adjusting the corresponding additional metadata data field width allocation to the alternate metadata data field width allocation; and
    e. Inserting or updating the data record into the database.

16. The method of claim 13, further comprising:
    a. Attempting to insert or update the data record into the database prior to determining that a plurality of corresponding data field width allocations of the metadata are each insufficient to fully store a plurality of separate content of each of a plurality of corresponding data fields of the data record;
    b. Detecting a succession of DBMS error messages indicating that the additional data field exceeds the additional corresponding data field allocation width;
    c. Proceeding on to determining a series of alternate metadata data field width allocations, with each metadata data field width allocation of the series of alternate metadata data field width allocations greater or equal to a width sufficient to fully store the content of a selected data field of the plurality of corresponding data fields of the data record;
    d. Sequentially adjusting the corresponding additional metadata data field width allocations to each of the series of the alternate metadata data field width allocations; and
    e. Inserting or updating the data record into the database.

* * * * *